(12) United States Patent
Lee

(10) Patent No.: US 7,522,318 B2
(45) Date of Patent: Apr. 21, 2009

(54) SCANNER OPTICAL MODULE

(75) Inventor: Yang-Teh Lee, Sindian (TW)

(73) Assignee: Cal-Comp Electronics & Communications Company Limited, Sindian (TW)

( * ) Notice: Subject to any disclaimer, the term of this patent is extended or adjusted under 35 U.S.C. 154(b) by 678 days.

(21) Appl. No.: 11/036,036

(22) Filed: Jan. 18, 2005

(65) Prior Publication Data

US 2006/0158695 A1 Jul. 20, 2006

(30) Foreign Application Priority Data

Jan. 29, 2004 (JP) ............................. 2004-022069
Dec. 2, 2004 (JP) ............................. 2004-349489

(51) Int. Cl.
*H04N 1/04* (2006.01)
*H01J 5/02* (2006.01)
*H01J 5/16* (2006.01)

(52) U.S. Cl. .................. 358/474; 358/494; 358/498; 250/234; 250/236; 250/239

(58) Field of Classification Search .............. 358/497, 358/474, 482, 505, 496, 471, 494, 498; 382/312, 382/313, 318, 319; 399/211, 212; 250/234, 250/236, 239
See application file for complete search history.

(56) References Cited

U.S. PATENT DOCUMENTS

| 5,131,157 A | * | 7/1992 | Hoagland | 33/448 |
| 6,010,318 A | * | 1/2000 | Li | 417/423.13 |
| 6,091,516 A | * | 7/2000 | Chang et al. | 358/474 |
| 6,178,013 B1 | * | 1/2001 | Lin | 358/474 |
| 6,330,084 B1 | * | 12/2001 | Chiang | 358/497 |
| 6,744,538 B2 | * | 6/2004 | Chen | 358/474 |
| 6,762,864 B2 | * | 7/2004 | Kao | 358/497 |
| 7,180,641 B2 | * | 2/2007 | Chang et al. | 358/497 |
| 2002/0149803 A1 | * | 10/2002 | Tang et al. | 358/474 |
| 2003/0169463 A1 | * | 9/2003 | Sheng et al. | 358/474 |
| 2004/0263917 A1 | * | 12/2004 | Hong et al. | 358/474 |
| 2006/0158695 A1 | * | 7/2006 | Lee | 358/474 |

FOREIGN PATENT DOCUMENTS

| EP | 1528786 A2 | * | 5/2005 |
| EP | 1562081 A1 | * | 10/2005 |
| TW | 348875 U | | 9/1993 |
| TW | 350557 U | | 9/1993 |
| TW | 350557 U | * | 11/1993 |

OTHER PUBLICATIONS

Miyajima,H."MEMS optical scanners for microscope",May-Jun. 2004, IEEE, vol. 10 issue-3, pp. 514-527.*
Kaufman, K. "Invasion of the body scanners", May 1997, IEEE, vol. 13 issue-, p. 12-17.*

* cited by examiner

*Primary Examiner*—Mark K Zimmerman
*Assistant Examiner*—Haris Sabah
(74) *Attorney, Agent, or Firm*—Birch, Stewart, Kolasch & Birch, LLP

(57) ABSTRACT

A scanner optical module has a single transmission axle used to support a scanning module (containing a traditional optical device or CIS). The scanning module has a plurality of protrusions (or rollers) slidably (or rotatably) contacting the transparent document platform (view). The scanner optical module has fewer assembled components, a simpler structure, a decreased material cost and production cost, and is modular.

13 Claims, 14 Drawing Sheets

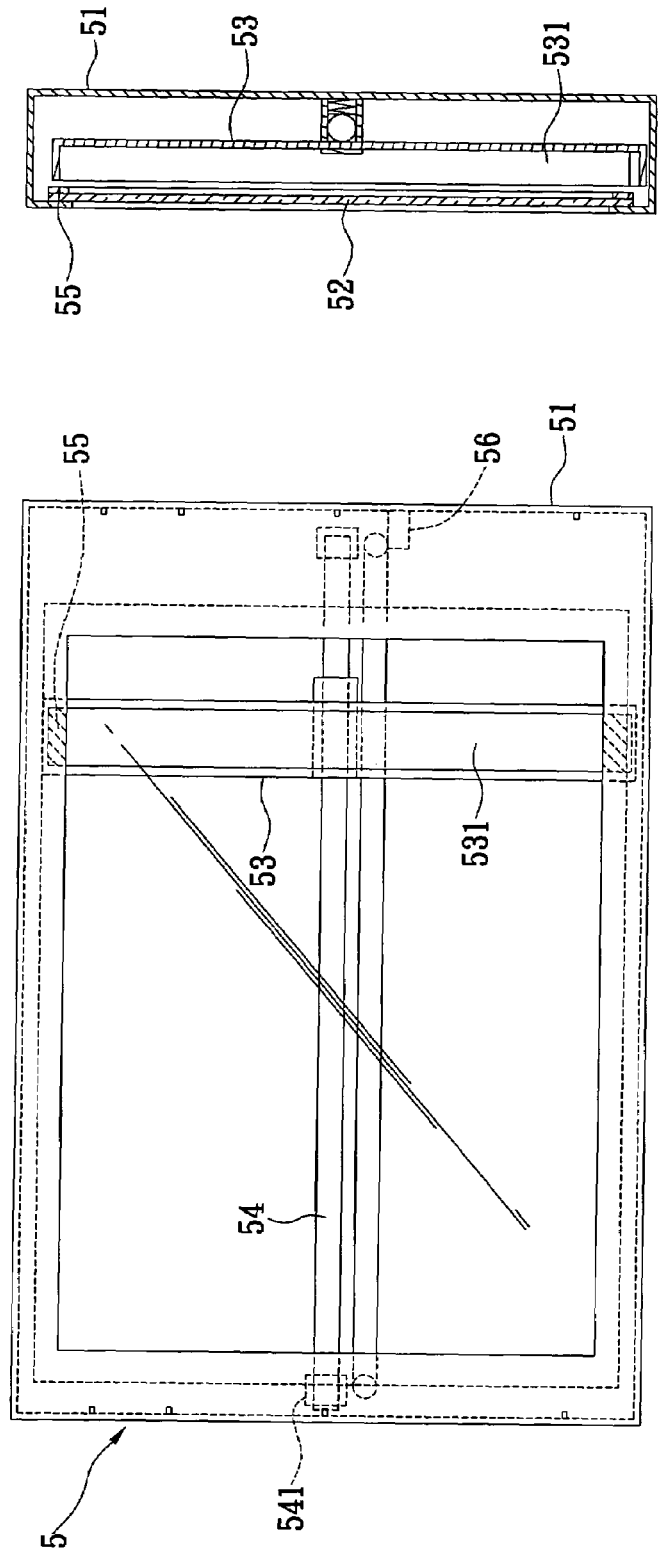
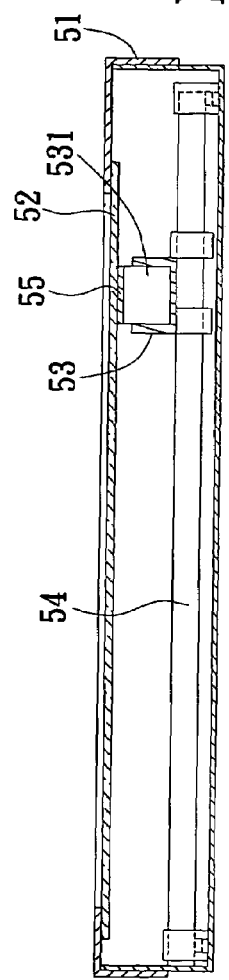
FIG. 1 PRIOR ART
FIG. 2 PRIOR ART
FIG. 3 PRIOR ART

SCANNER OPTICAL MODULE

BACKGROUND OF THE INVENTION

1. Field of the Invention

The present invention relates to a scanner optical module, and particularly relates to an improved scanner optical module for simplifying the structure, decreasing the material cost and production cost, and reducing assembled components and increasing assembly efficiency.

2. Description of the Related

Scanner has gradually become standard equipment for computer users. A computer can read image data from any material scanned by a scanner. The principle of the scanner is very simple; namely a light source shines on a part of a document, and then reflected light is read to get image data of that part of the document. Moreover, the image data can be read into image processing software for retouching. If the document comprises text, the text can be stored as a text file in the computer by character recognition software.

The conventional platform scanner uses a conventional optical device, such as a CCD (Charge-Coupled Device), to read the document image. The assembly of the CCD and the lens needs a long optical path, so the volume of the scanner cannot be reduced. Even if using the refraction method to reduce the volume of the scanner by a lens, the reduction level is very limited. In order to reduce the volume of the scanner, a CIS (Contact Image Sensor) is used instead of the CCD. The CIS has already become a CIS module according to the prior art, so all components of the CIS can be installed on the same CIS module. Hence, the CIS module is used with the platform scanner, not only reducing the volume and the weight of the scanner, but also simplifying the inner structure of the scanner and reducing the cost of the assembly and the maintenance. Referring to TW 348875 and TW 350557, the prior art provides a CIS used with the scanner.

Furthermore, the transmission axle of the prior art is a dual transmission axle. Hence the structure of the dual transmission axle is very complex, and the material cost of the transmission axle is very expensive.

Referring to FIG. 1, the CIS scanner 5 of the prior art includes a transparent document platform (windows) 52, a scanner module 53, a transmission axle 54, a plurality of sliding devices 55 and a drive device 56. The transparent document platform 52 is installed under a machine platform 51 for receiving documents. The scanner module 53 with a CIS 531 is installed under the transparent document platform 52 for reading image data of the documents. The transmission axle 54 is installed under the scanner module 53, and has two supports 541 installed at two sides thereof and fixed in the machine platform 51 for supporting upwardly the scanner module 53 and attaching tightly the transparent document platform 52 for movement. The sliding devices 55 are installed at two sides of the scanner module 53 and attach tightly to the transparent document platform 52 for reducing friction between the scanner module 53 and the transparent document platform 52. The drive device 56 connects to the scanner module 53 for driving the scanner module 53 to move from one side to another side of the document.

However, the scanner module 53 of the prior art is too complex, so that the scanner module 53 cannot achieve a module function. Furthermore, surface contact occurs between the transmission axle 54 and the scanner module 53 to result in a large friction force, so that the scanner module 53 cannot move smoothly. If abrasion pads installed on the scanner module 53, the cost thereof will increase.

With the employment of unique considerations and application of theories, and based on several years experience in specialized production of all flexible assembly systems and mechanisms, the inventor has come up with an innovative scanner optical module.

SUMMARY OF THE INVENTION

The main object of the present invention is to provide a scanner optical module. The scanner optical module has some advantages, including fewer assembled components, a simpler structure, decreased material cost and production cost, and module function.

Another object of the present invention is to provide a scanner optical module with point contact occurring between the transmission axle and the scanner module for reducing friction between the transmission axle and the sliding groove.

In order to achieve the above objects, the present invention provides a scanner optical module, comprising a top cover, a transparent document platform, a scanning module, a transmission axle, a plurality of protrusions and a drive device.

The transparent document platform is installed under the top cover for receiving documents. The scanning module is installed under the transparent document platform for reading document image data. The transmission axle is installed under the scanning module, and has two sides fixed into an inner side of the top cover. The protrusions are installed flexibly on the scanning module, and slidably contact the transparent document platform. The drive device is connected to the scanning module for driving the scanning module to move in a scanning direction.

In order to achieve the above objects, the present invention provides a scanner optical module, comprising a top cover, a transparent document platform, a scanning module, a transmission axle, a plurality of rollers and a drive device.

The transparent document platform is installed under the top cover for receiving documents. The scanning module is installed under the transparent document platform for reading document image data. The transmission axle is installed under the scanning module, and has two sides fixed into an inner side of the top cover. The rollers are installed flexibly on the scanning module, and rotatably contact the transparent document platform. The drive device is connected to the scanning module for driving the scanning module to move along a scanning direction.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawing, in which:

FIG. 1 is a top view of the scanner of the prior art;

FIG. 2 is a front view of the scanner of the prior art;

FIG. 3 is a side view of the scanner of the prior art;

DETAILED DESCRIPTION OF PREFERRED EMBODIMENTS

Figure 6:
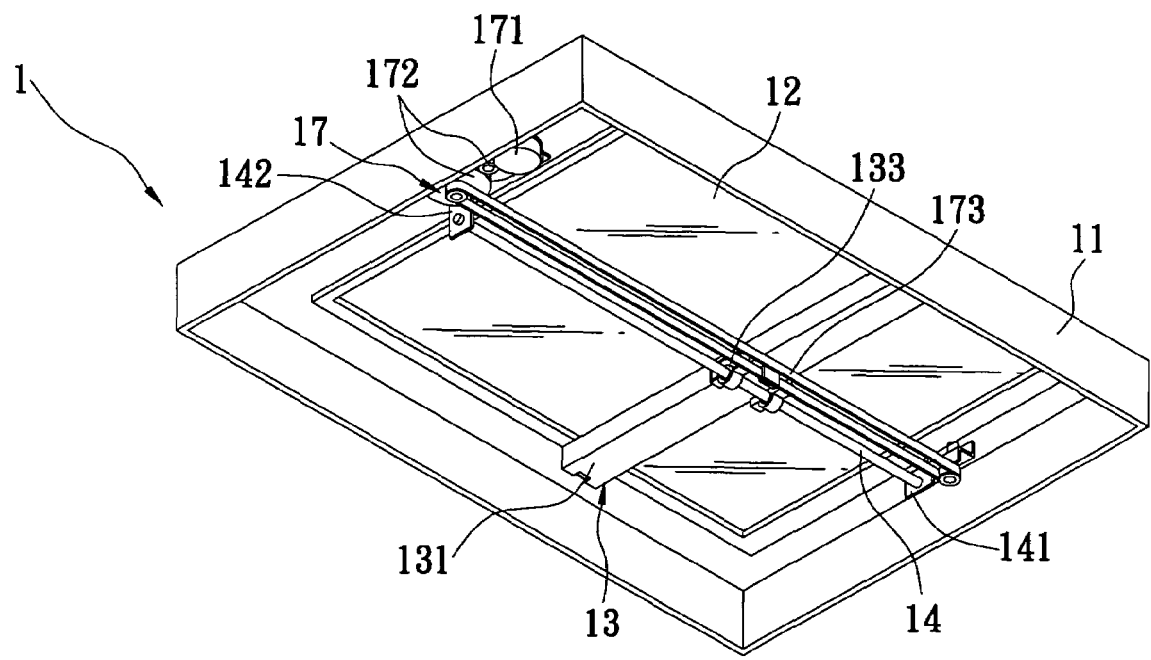
FIG. 6 is a perspective, assembled view of the scanner optical module of the present invention.
Figure 7:
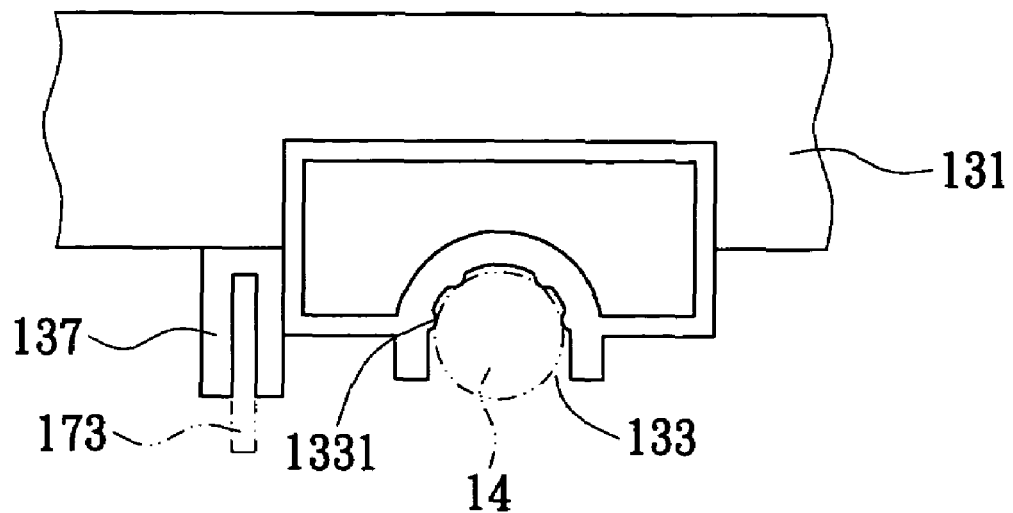
FIG. 7 is a partial schematic view of the scanner optical module according to the first embodiment of the present invention.
Figure 8:
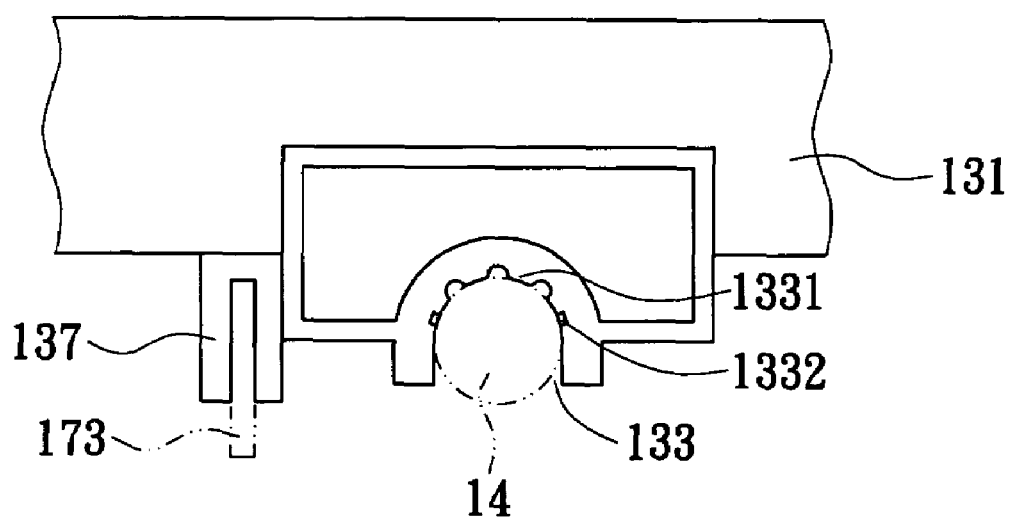
FIG. 8 is a partial schematic view of the scanner optical module according to the second embodiment of the present invention.
Figure 9:
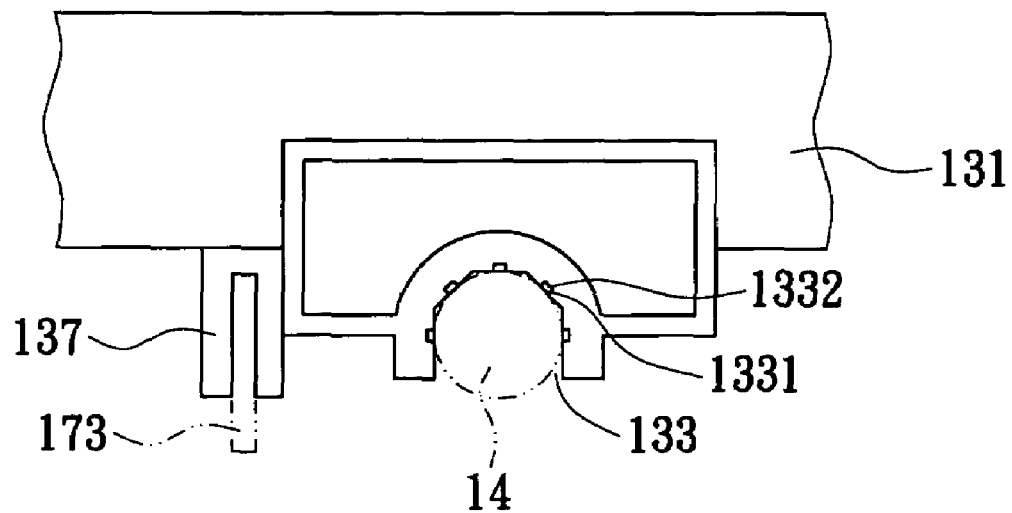
FIG. 9 is a partial schematic view of the scanner optical module according to the third embodiment of the present invention.
Figure 10:
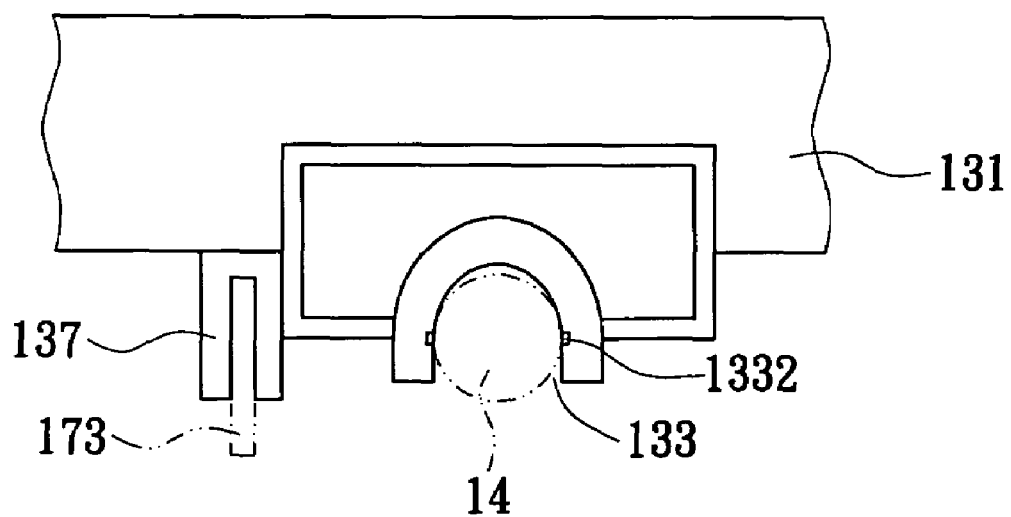
FIG. 10 is a partial schematic view of the scanner optical module according to the fourth embodiment of the present invention.

Referring to FIGS. 2 and 6, the present invention provides a scanner optical module, including a top cover 11, a transparent document platform (windows) 12, a scanning module 13, a transmission axle 14, two elastic elements 16 and a drive device 17. The transparent document platform 12 is made of transparent material like glass, and is installed under the top cover 11 for receiving documents.

Figure 4:
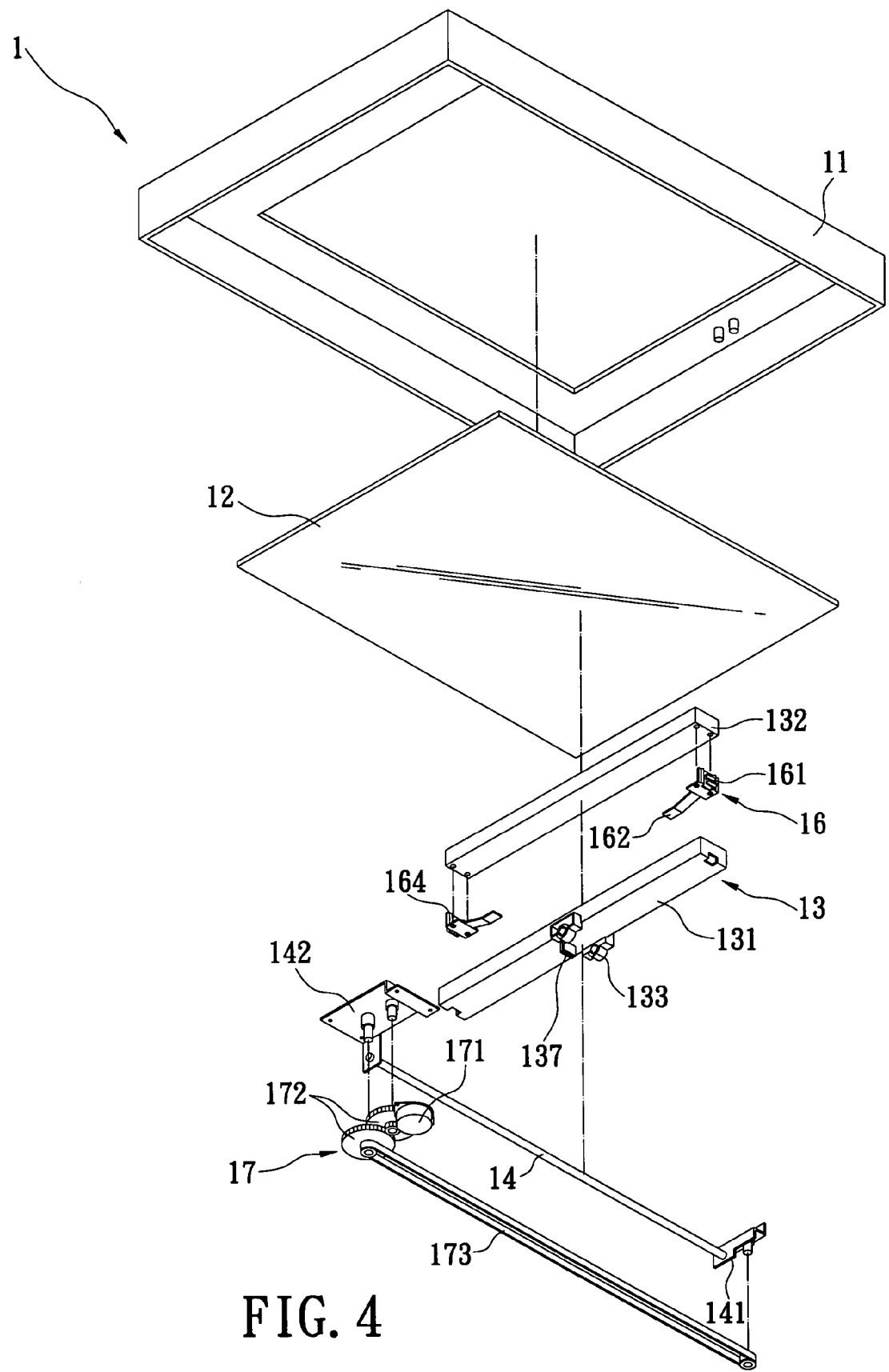
FIG. 4 is a perspective, exploded view of the scanner optical module of the present invention.
Figure 4A:
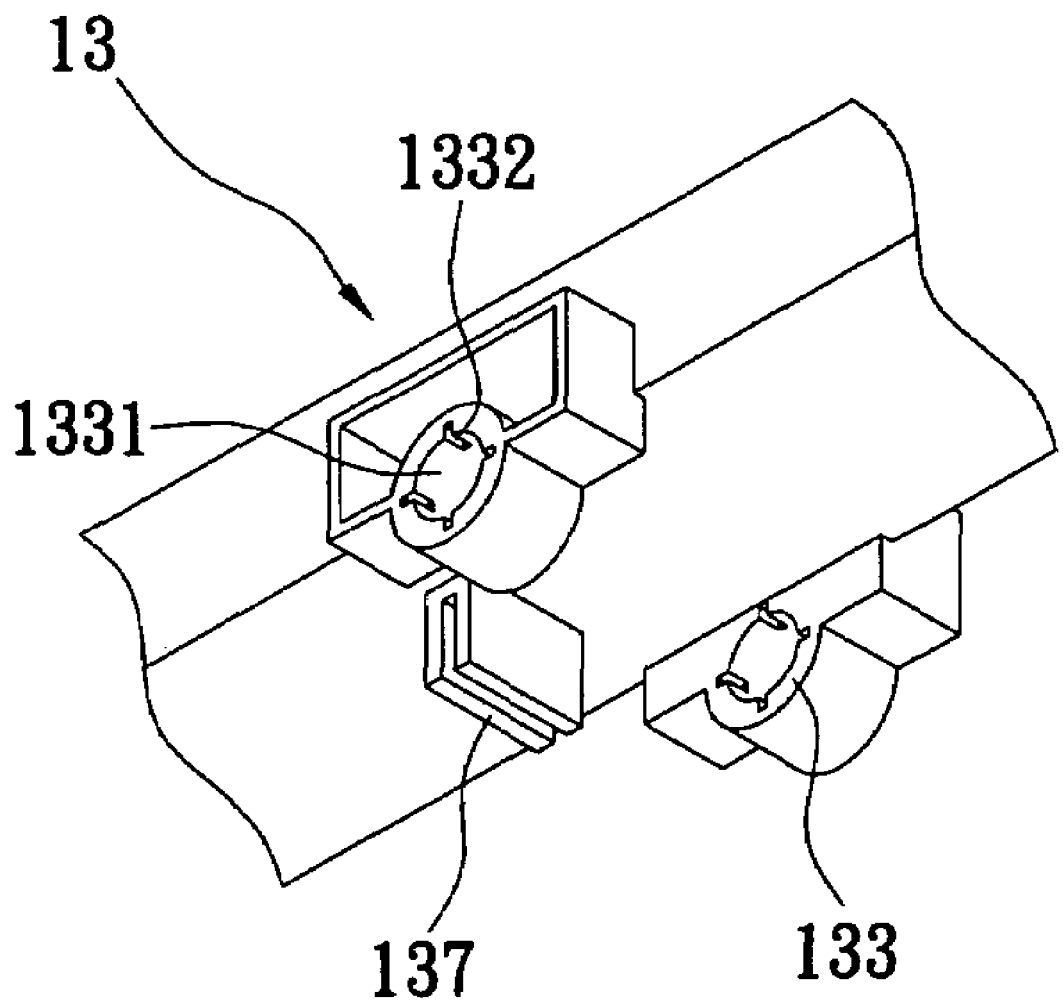
FIG. 4A is a partial perspective view of the scanner CIS module of the present invention.
Figure 5:
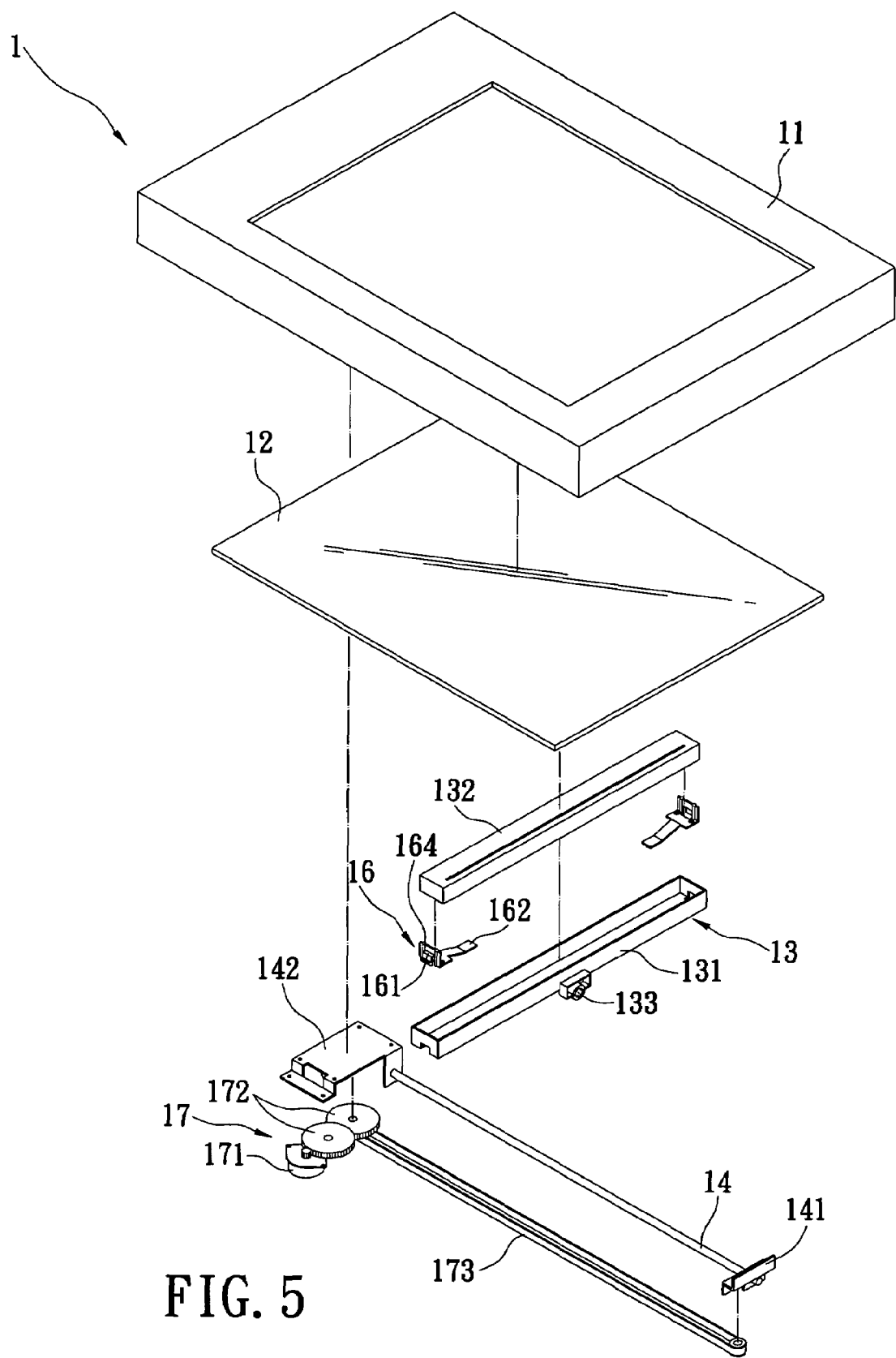
FIG. 5 is another perspective, exploded view of the scanner CIS module of the present invention.

The scanning module 13 is installed movably in the top cover 11 and under the transparent document platform 12 for reading image data. The scanning module 13 has a support 131, and a CIS 132 installed on the support 131. The CIS 132 has includes a light source, lens and a photoelectric transforming device (not shown), thus forming a module design. The scanning module 13 has a sliding groove 133 arranged on a bottom side and middle portion of the support 131. The sliding groove 133 is an almost completely covered hollow groove with multiple contact points (as shown in FIG. 4A), or a half-covered hollow groove with a U-shape (as shown in FIGS. 7-10).

The transmission axle 14 is installed under a center of the scanning module 13, and has an idle wheel support 141 arranged at one side thereof and a transmission support 142 arranged at the other side thereof and fixed in the top cover 11. The scanning module 13 slides on the transmission axle 14 by the sliding groove 13. The transmission axle 14 supports upwardly the scanning module 13, and the scanning module 13 attaches tightly the transparent document platform 12 for movement. The sliding groove 133 has an inner wall that can be changed into many different shapes to form multiple contact points 1331 (as shown in FIGS. 4A and 7-9) for resulting point contact between the sliding groove 133 and the transmission axle 14. In another embodiment, the sliding groove with an oval shape contacts the transmission axle 14 to form two points of tangency (as in FIG. 10). The sliding groove 133 has two concave oil storage tanks 1332 formed near the two points of tangency, respectively. In other words, the sliding groove 133 has two concave oil storage tanks 1332 formed between the sliding groove 133 and the transmission axle 14 to store the lubricant for self-lubrication of the scanner optical module.

Figure 11:
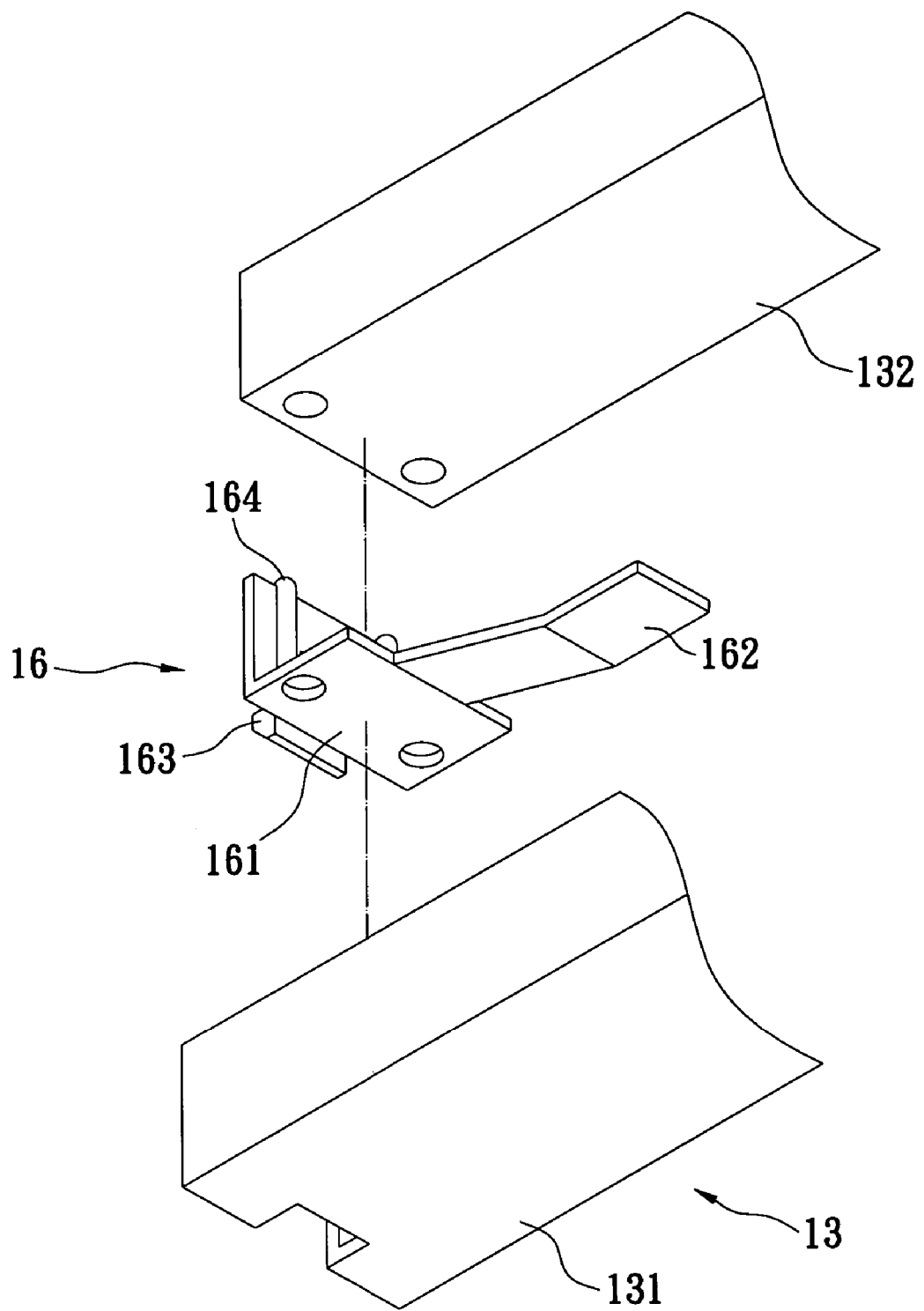
FIG. 11 is a perspective, exploded view of the elastic element and the scanner module of the present invention.
Figure 12:
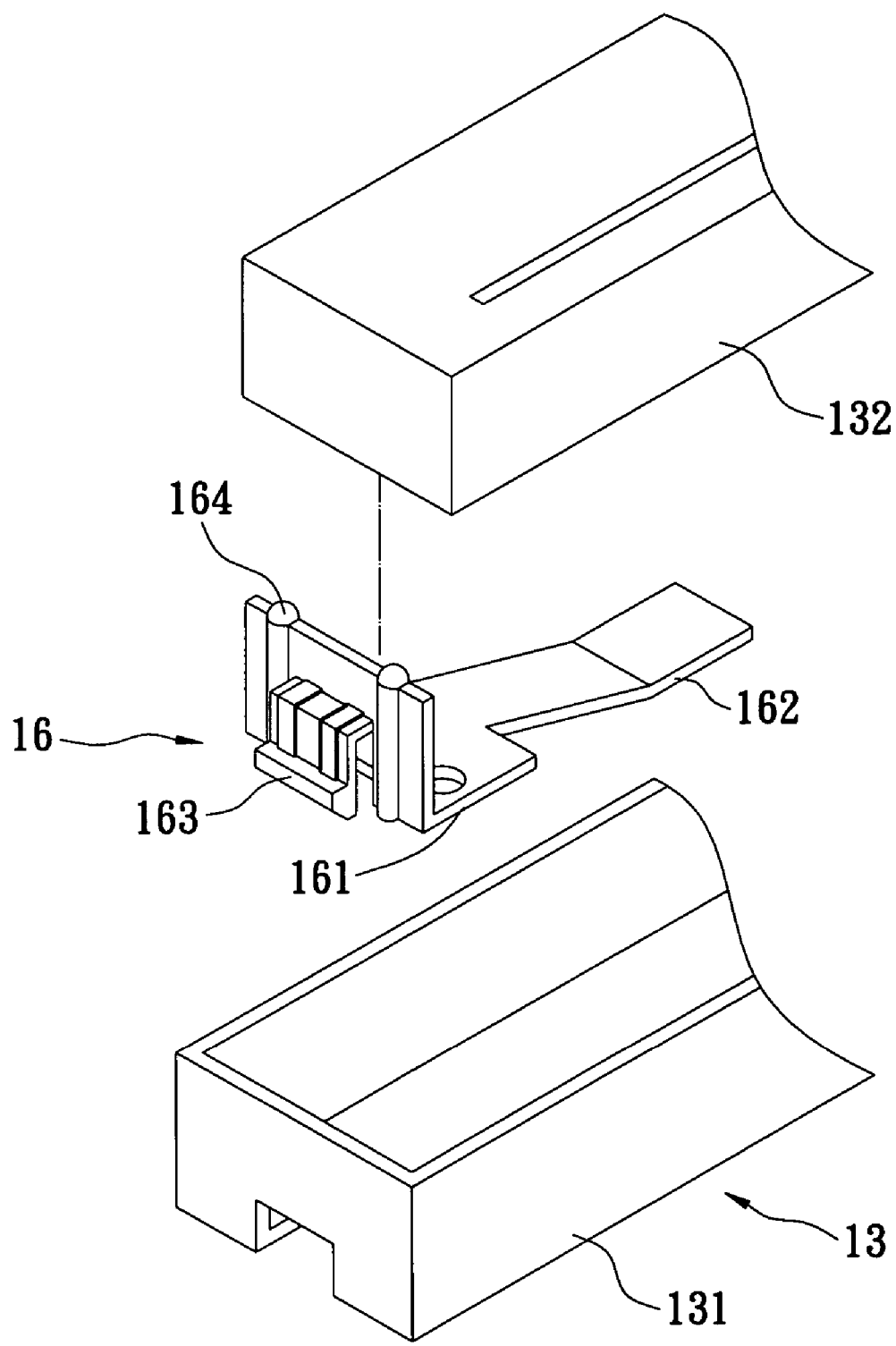
FIG. 12 is another perspective, exploded view of the elastic element and the scanner module of the present invention.
Figure 13:
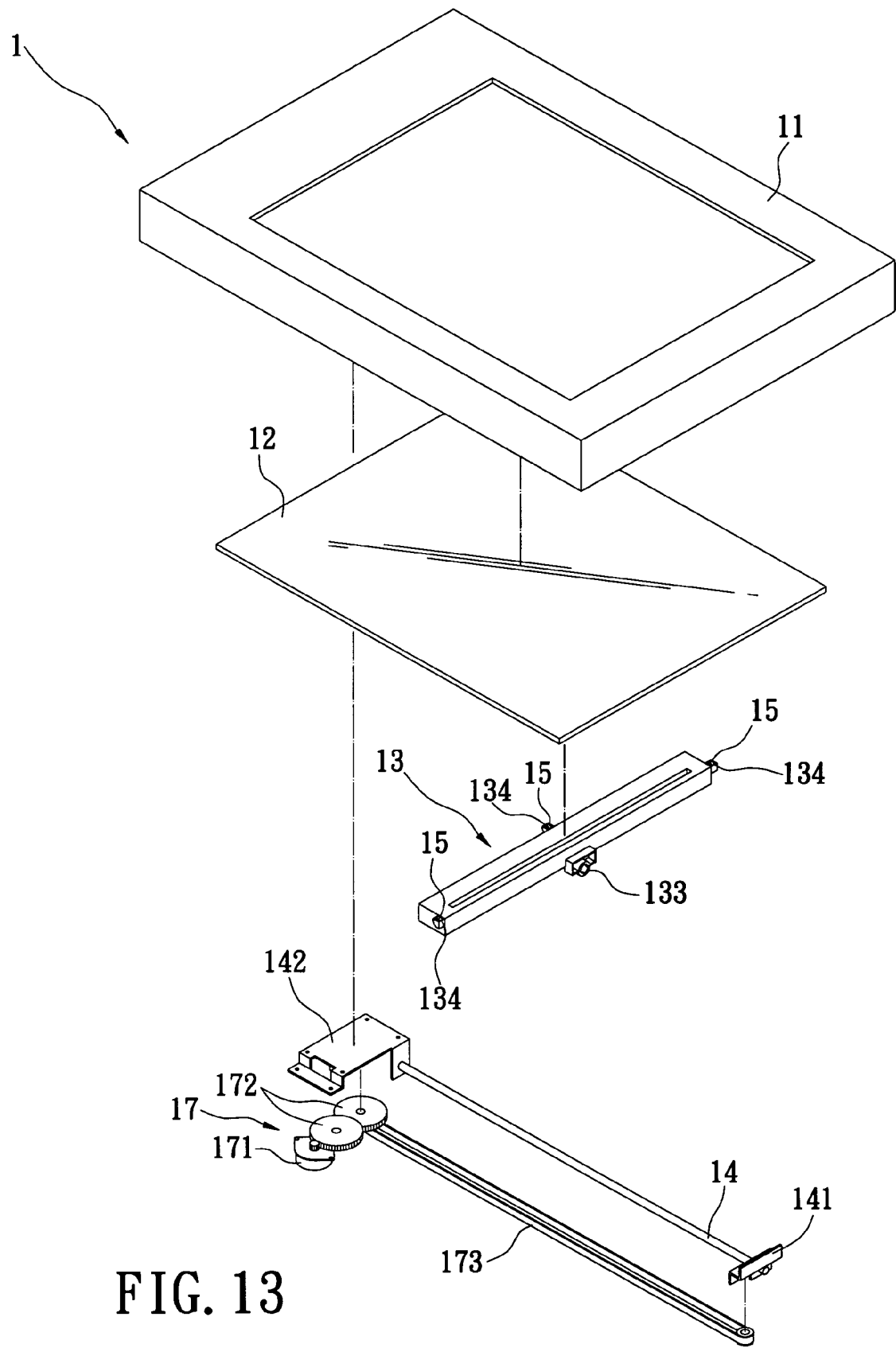
FIG. 13 is a perspective, exploded view according to another embodiment (Scanner Optical module) of the present invention.
Figure 14:
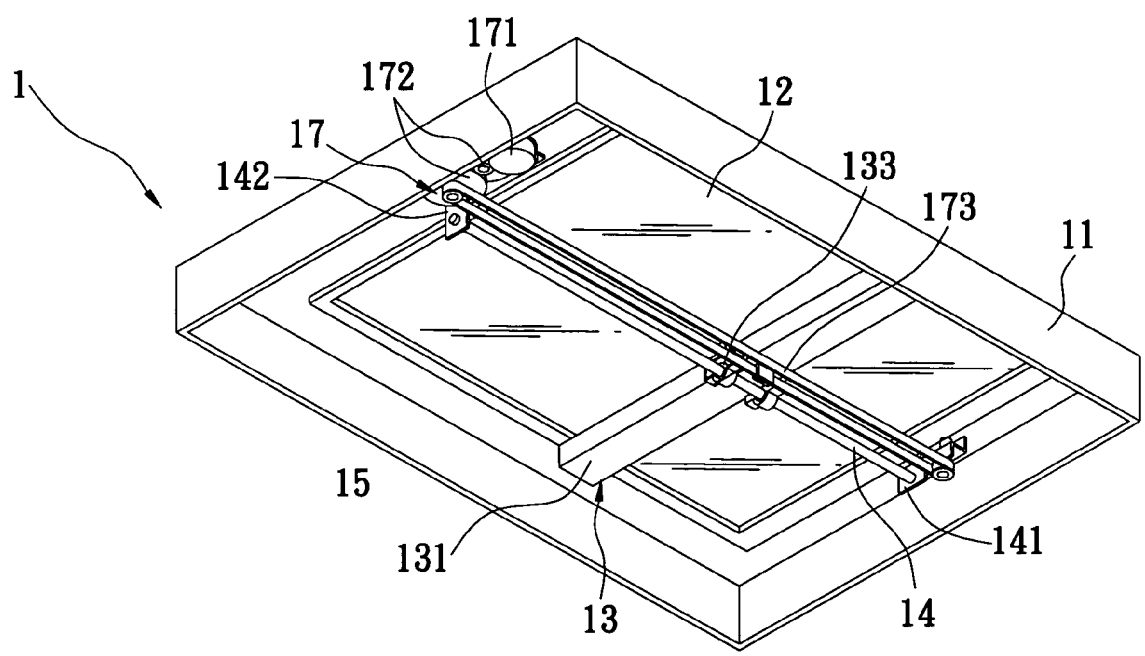
FIG. 14 is a perspective, assembled view according to another embodiment (Scanner Optical module) of the present invention.
Figure 15:
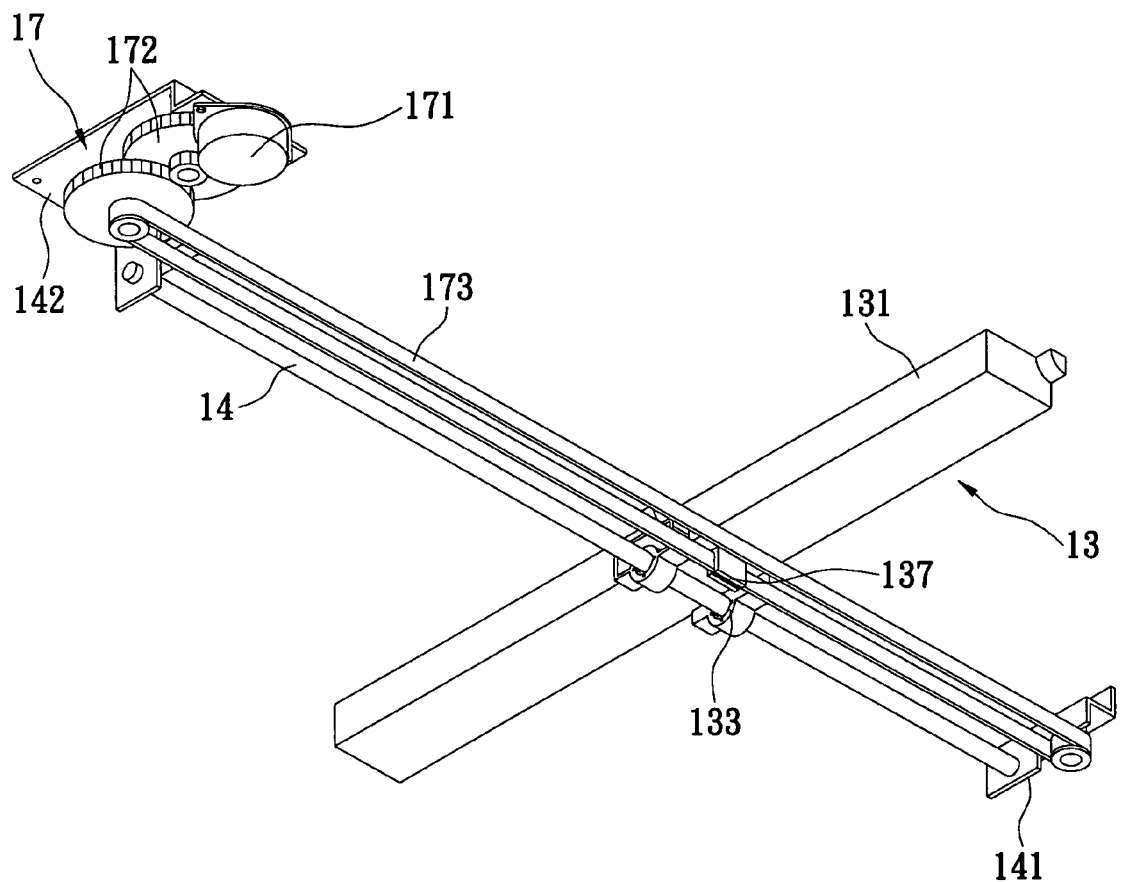
FIG. 15 is a perspective, assembled view according to another embodiment of the scanner module and the drive device of the present invention.
Figure 16:
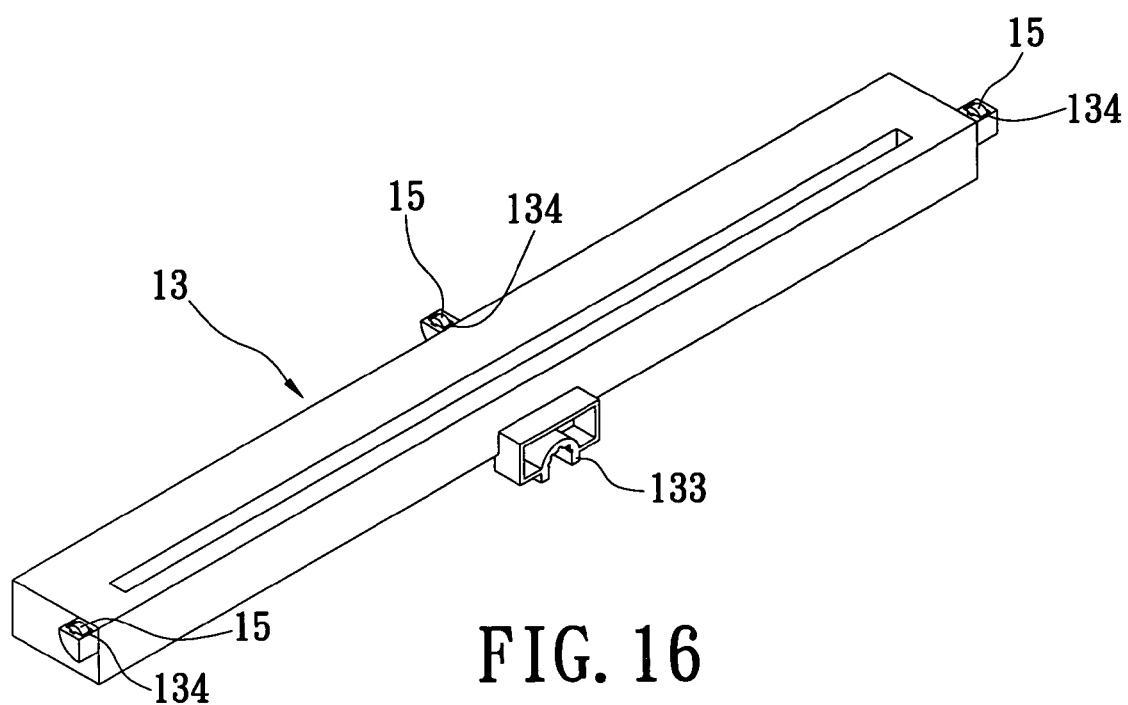
FIG. 16 is a perspective, assembled view according to another embodiment of the scanner optical module of the present invention.
Figure 17:
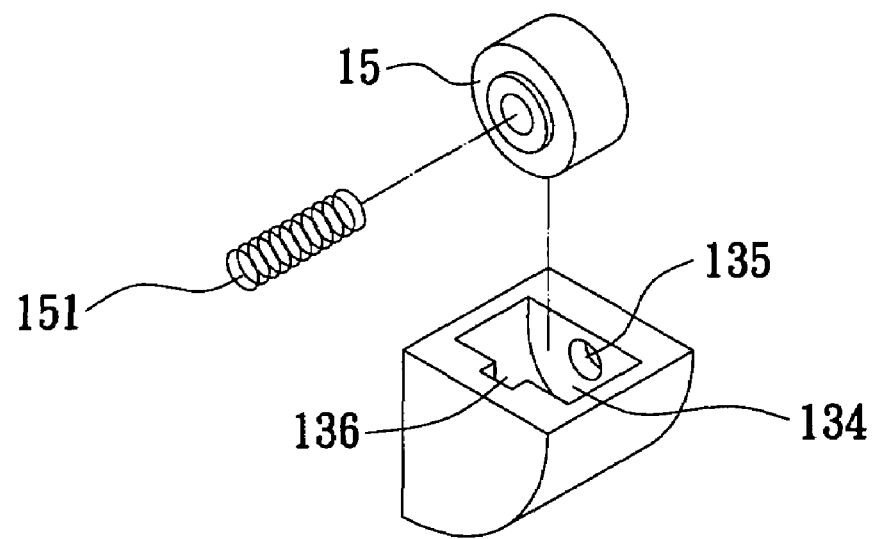
FIG. 17 is a perspective, exploded view according to another embodiment of the roller of the present invention.
Figure 18:
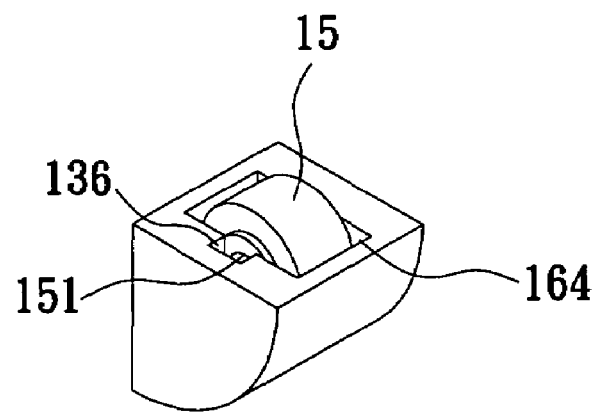
FIG. 18 is a perspective, assembled view according to another embodiment of the roller of the present invention.

The two elastic elements 16 are made of elastic material, and each have a fixed portion 161 and an elastic arm 162 (as shown in FIGS. 11 and 12). The fixed portion 161 with an L-shape has two protrusions 164 extending from a top side thereof, and attaches tightly to the transparent document platform 12 to allow the two protrusions 164 to contact slidably the transparent document platform 12 with multiple contact points. The elastic arm 162 is integrally connected to the fixed portion 161, and extends downwardly along an inclined direction. Screws fasten the two fixed portions 161 of the two elastic elements 16 on two sides of the CIS 132 of the scanning module 13, respectively. The two elastic arms 162 of the two elastic elements 16 are extended slantwise under a bottom side of the CIS 132, so the two elastic arms 162 contact a bottom side of the support 131 for pushing the CIS 132 to move vertically. The protrusions 164 are arranged on the scanning module 13 to attach the CIS 132 tightly to the transparent document platform 12 for movement to absorb the tolerance. Each of the fixed portions 161 has an elastic hook 163 hooked on one side of the support 131 of the scanning module 13 for positioning.

The drive device 17 has a driver stepping motor 171, a speed reducing gear set 172 and a transmission element 173. The driver stepping motor 171 and the speed reducing gear set 172 are used to drive the transmission support 142 to fix into an inner side of the top cover 11. The transmission element 173 is a flexible transmission element, such as a timing belt. The driver stepping motor 171 connects to the transmission element 173 through the speed reducing gear set 172. The transmission element 173 is fixed on a connected portion 137 of the scanning module 13 to allow the drive device 17 to connect to the scanning module 13. Power from the driver stepping motor 171 is transmitted to the transmission element 173 through the speed reducing gear set 172 and drives the scanning module 13 to move from one side of the document to the other side of the document to scan the document.

FIGS. 13 to 18 illustrate another embodiment of the present invention. The scanning module (will be a traditional optical scanner system to replace CIS module) 13 has three receiving grooves 134 formed at two sides and a middle side thereof, respectively. The scanning module 13 has three rollers 15 installed in the three receiving grooves 134, respectively. Each of the receiving grooves 134 has a closed first pivot hole 135 formed at in one side thereof, and an open second pivot hole 136 formed in the other side thereof for assembly. The scanning module 13 further has three elastic pivots 151, each installed through an axle center of the roller 15. Each of the elastic pivots 151 has two sides; one side of the elastic pivot 151 is installed in the first pivot hole 135, and the other side is installed in the second pivot hole 136. Each of the rollers 15 rotatably contact the transparent document platform 12 by three contact points for reducing the friction coefficient between the scanning module 13 and the transparent document platform 12. The rollers 15 are installed flexibly at the two sides and the middle side of the scanning module 13, so the scanning module 13 can attach tightly to the transparent document platform 12 to move for absorbing the tolerance and balancing the movement of the scanning module 13.

To sum up, the scanner optical module of the present invention includes some advantages, including:

1. The transmission axle 14 is a single transmission axle for ensuring that the movement of the scanning module 13 is balanced.

2. The scanning module 13 has protrusions 164 and rollers 15 used to balance the scanning module 13 for increasing the scanning quality and holding the scanning module 13 to allow smooth movement.

3. The point contact occurs between the transmission axle 14 and the scanning module 13 for reducing the friction force between the transmission axle 14 and the sliding groove 133. The sliding groove 133 has two concave oil storage tanks 1332 formed between the sliding groove 133 and the transmission axle 14 to store lubricant for self-lubrication of the scanner optical module.

4. The scanning module 13 has elastic elements 16 (or elastic pivots 151) for attaching the protrusions 164 (or rollers 15) of the scanning module 13 flexibly and tightly to the transparent document platform 12, thus allow movement for absorbing the tolerance. Even if the present invention has some error in assembly or the top cover 11 is somewhat changed in shape, the scanning module 13 attaches tightly to transparent document platform 12. When scanning module 13 moves on the transmission axle 14, the distance between the scanning module 13 and transmission axle 14 is predetermined for holding the document within a predetermined depth of field, thus ensuring the quality of the image.

5. All of the components can be assembled on the top cover 11. Hence, if the present invention is turned over for anything, the components do not separate from the top cover 11 for achieving the module function, and may be conveniently assembled on any other device.

Although the present invention has been described with reference to the preferred embodiment thereof, it will be understood that the invention is not limited to the details thereof. Various substitutions and modification have suggested in the foregoing description, and other will occur to those of ordinary skill in the art. Therefore, all such substitutions and modifications are intended to be embraced within the scope of the invention as defined in the appended claims.

What is claimed is:

1. A scanner optical module comprising:
   a top cover;
   a transparent document platform installed under the top cover for receiving documents;
   a scanning module installed under the transparent document platform for reading document image data, wherein the scanning module has a sliding groove arranged on a bottom side and middle portion thereof, and the sliding groove has a plurality of contact points formed on an inner wall thereof for point contact between the sliding groove and the transmission axle;
   a transmission axle installed under the scanning module, and having two sides fixed into an inner side of the top cover;
   a plurality of protrusions installed flexibly on the scanning module, and contacted slidably to the transparent document platform; and
   a drive device connected to the scanning module for driving the scanning module to move along a scanning direction,
   wherein the sliding groove is a completely covered hollow groove or a half-covered hollow groove, and has concave oil storage tanks formed between the sliding groove and the transmission axle, the sliding groove slidably matching the transmission axle, and the concave oil storage tanks storing lubricant for self-lubrication of the scanner optical module.

2. The scanner optical module as claimed in claim 1, wherein the scanning module has a support, and a CIS installed on the support.

3. The scanner optical module as claimed in claim 2, further comprising an elastic element installed on the CIS for pushing the CIS to attach tightly to the transparent document platform for movement.

4. The scanner optical module as claimed in claim 3, wherein the elastic element has a fixed portion and an elastic arm, the elastic element fixed on the CIS by the fixed portion, and the protrusion fixed on a top side of the fixed portion, and the elastic arm contacted against a bottom side of the support.

5. The scanner optical module as claimed in claim 3, wherein the elastic element is fixed on two sides of the CIS.

6. The scanner optical module as claimed in claim 5, wherein the elastic element has an elastic hook projected therefrom, and the elastic hook is hooked on two sides of the support.

7. The scanner optical module as claimed in claim 1, wherein the transmission axle has two supports arranged at two sides thereof, and the two support are fixed in the top cover.

8. The scanner optical module as claimed in claim 1, wherein the drive device has a driver stepping motor, a speed reducing gear set and a transmission element, wherein the driver stepping motor and the speed reducing gear set are used to drive the transmission support to fix into an inner side of the top cover, the driver stepping motor is connected to the transmission element through the speed reducing gear set, and the transmission element is fixed on and connected to the scanning module.

9. A scanner optical module, comprising:
   a top cover;
   a transparent document platform installed under the top cover for receiving documents;
   a scanning module installed under the transparent document platform for reading document image data, wherein the scanning module has a sliding groove arranged on a bottom side and middle portion thereof, and has a plurality of contact points formed on an inner wall thereof for point contact between the sliding groove and the transmission axle;
   a transmission axle installed under the scanning module, and having two sides fixed into an inner side of the top cover;
   a plurality of rollers installed flexibly on the scanning module, and rotatably contacting the transparent document platform; and
   a drive device connected to the scanning module for driving the scanning module to move along a scanning direction,
   wherein the sliding groove is a completely covered hollow groove or a half-covered hollow groove, and has concave oil storage tanks formed between the sliding groove and the transmission axle, the sliding groove slidably matching the transmission axle, and the concave oil storage tanks storing lubricant for self-lubrication of the scanner optical module.

10. The scanner optical module as claimed in claim 9, wherein the transmission axle has two supports arranged at two sides thereof, and the two supports are fixed in the top cover.

11. The scanner optical module as claimed in claim 9, wherein the drive device has a driver stepping motor, a speed reducing gear set and a transmission element, wherein the driver stepping motor and the speed reducing gear set are used to drive the transmission support to fix into an inner side of the top cover, the driver stepping motor is connected to the transmission element through the speed reducing gear set, and the transmission element is fixed on and connected to the scanning module.

12. The scanner optical module as claimed in claim 9, wherein the scanning module has a plurality of receiving grooves formed thereon and the rollers are installed in the corresponding receiving grooves, wherein each of the receiving grooves has a closed first pivot hole formed in one side thereof and an open second pivot hole formed in another side thereof, and wherein the scanning module further has a plurality of elastic pivots, each installed through an axle center of the roller, each of the elastic pivots has two sides, one side of the elastic pivot is installed in the first pivot hole, and another side is installed in the second pivot hole.

13. The scanner optical module as claimed in claim 1, wherein the rollers are installed at two sides and a middle portion of the scanning module.

* * * * *